United States Patent Office 2,875,719
Patented Mar. 3, 1959

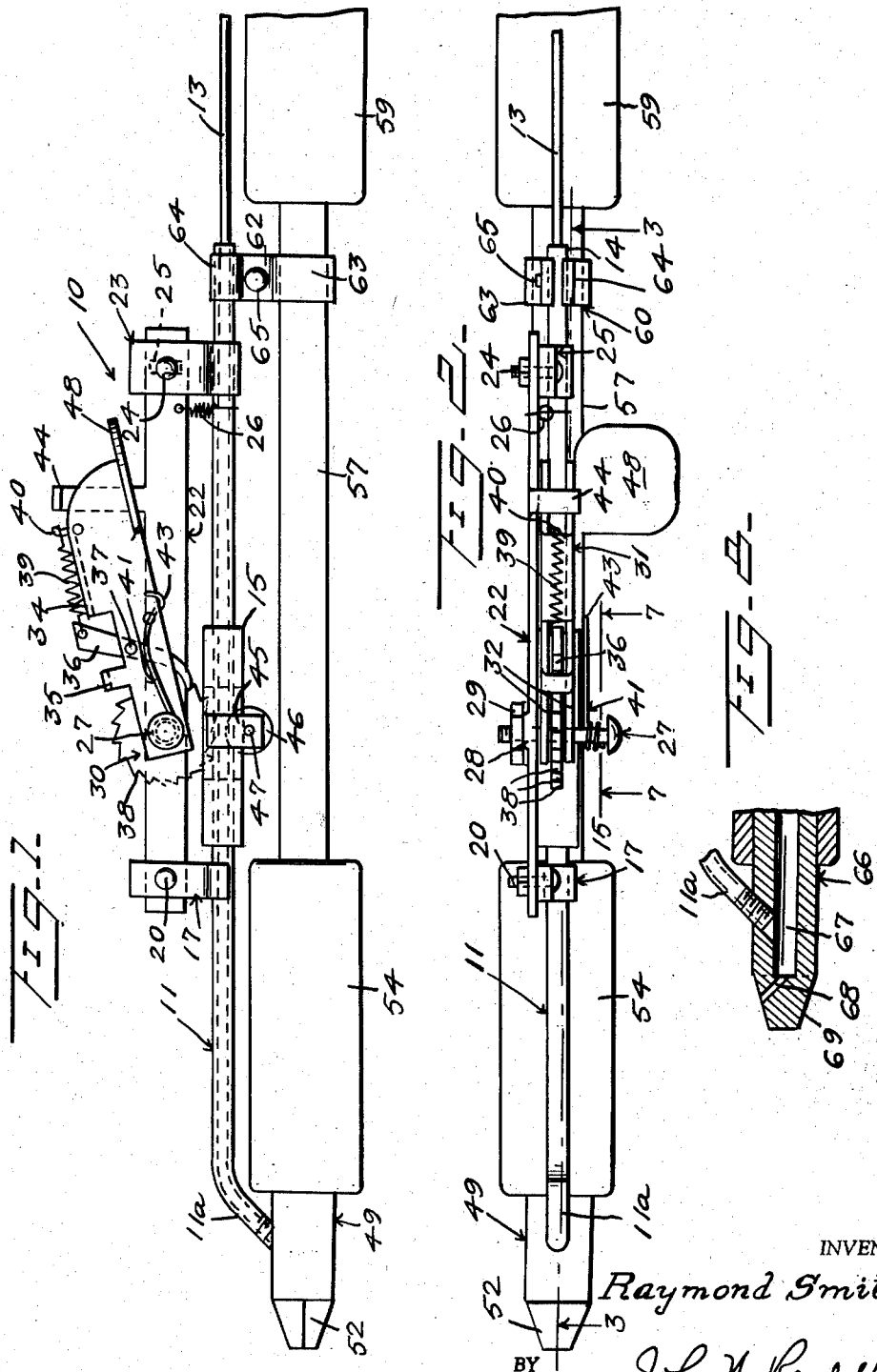

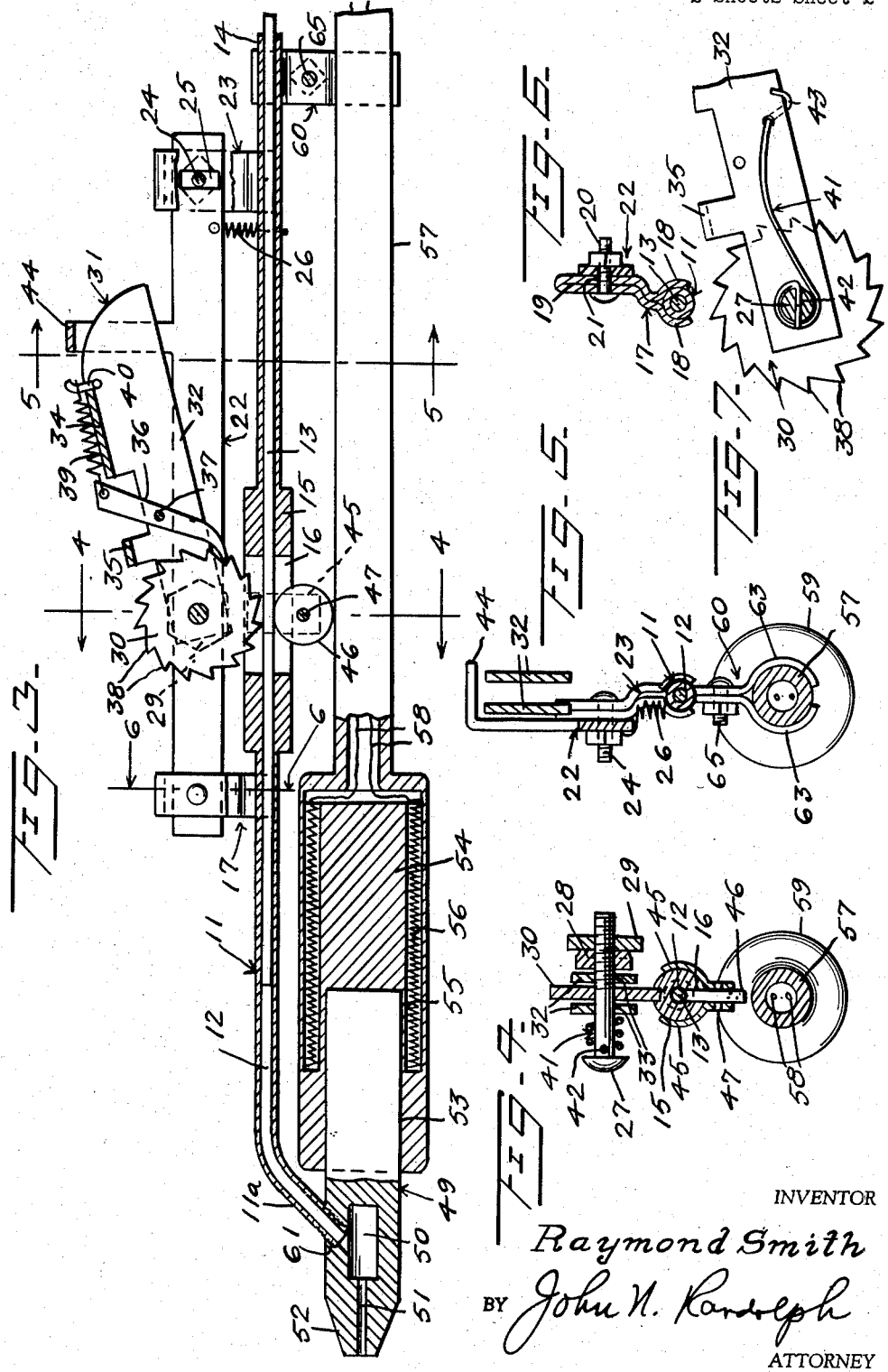

2,875,719

SOLDER FEEDING ATTACHMENT FOR A SOLDERING IRON

Raymond Smith, Reily, Ohio

Application February 29, 1956, Serial No. 568,524

7 Claims. (Cl. 113—109)

This invention relates to a novel attachment for use with a conventional soldering iron and by means of which solder in strand form may be fed, at the will of the user, to the heated tip of the soldering iron.

More particularly, it is a primary object of the present invention to provide a solder feeding attachment which may be manipulated by the thumb or a finger of the hand supporting the soldering iron for feeding solder to the tip of the iron, thus leaving the other hand of the user free for holding an element or elements being soldered.

A further object of the invention is to provide a solder feeding attachment including a manually actuated pawl and ratchet means for accomplishing the feeding of the solder.

A further object of the invention is to provide means for yieldably retaining a feeding element of the attachment in proper frictional contact with the solder strand to effect a feeding thereof.

Various other objects and advantages of the invention will hereinafter become more fully apparent from the following description of the drawings, illustrating a presently preferred embodiment thereof, and wherein:

Figure 1 is a side elevational view of a forward portion of a conventional soldering iron and showing the solder feeder attached thereto;

Figure 2 is a top plan view thereof;

Figure 3 is an enlarged longitudinal sectional view, partly in side elevation, taken substantially along a plane as indicated by the line 3—3 of Figure 2;

Figure 4 is a cross sectional view of a portion of the solder feeder and the soldering iron, taken substantially along a plane as indicated by the line 4—4 of Figure 3;

Figure 5 is a somewhat enlarged cross sectional view of the feeder attachment and soldering iron, taken substantially along a plane as indicated by the line 5—5 of Figure 3;

Figure 6 is a somewhat enlarged cross sectional view of a portion of the solder feeder, taken substantially along a plane as indicated by the line 6—6 of Figure 3;

Figure 7 is a fragmentary longitudinal sectional view primarily in side elevation showing portions of the solder feeder attachment in detail and taken substantially along a plane as indicated by the line 7—7 of Figure 2, and Figure 8 is a fragmentary longitudinal sectional view, partly in elevation, illustrating a slightly modified form of the soldering iron tip.

Referring more specifically to the drawings, the solder feeding attachment in its entirety is designated generally 10 and includes an elongated rigid tube 11 having a bore 12 extending from end-to-end therethrough and which is of a proper diameter to slidably receive therein a conventional strand 13 of solder which is fed thereto longitudinally from a rear end 14 of the tube 11. Said tube 11, intermediate of its ends, is provided with an externally enlarged portion 15. A slot 16 is formed in said enlarged portion 15 and extends diametrically therethrough so as to intersect a portion of the bore 12.

As seen in Figure 4, the slot 16 is preferably of a width slightly less than the diameter of the bore 12.

A combination standard and clamp 17, as best illustrated in Figure 6, is preferably formed from a single strip of resilient metal the end portions of which are bowed outwardly with respect to one another to form resilient clamping jaws 18 which are disposed in gripping engagement with the tube 11, forwardly of said enlarged portion 15. The intermediate portion of the strip, forming the standard and clamp 17, comprises a standard 19 which is laterally offset with respect to the jaws 18. The bolt of a nut and bolt fastening 20 extends crosswise through the standard 19 and loosely through an opening 21 in one end of a supporting bar 22 for swingably supporting said bar end on the bolt between one side of the standard 19 and the nut of said fastening 20. The bar 22 extends longitudinally of the tube 11 from the mounting 17 toward the rear end 14 of the tube. A second clamp and standard unit 23, of the same construction as the clamp and standard 17, is mounted on the tube 11 near to but spaced from its rear end 14. The bolt of the nut and bolt fastening 24 of the clamp and standard 23 extends loosely through a transversely elongated opening or slot 25 (see Figure 3) which is formed in the bar 22 near its opposite end. The connection of the bar 22 to the clamp and standard 23 by the fastening 24 and slot 25, permits said bar 22 to swing on the fastening 20 to a limited extent toward and away from the tube 11. A tension spring 26 is located adjacent the member 23 and has one end anchored to the bar 22 and the other end anchored to the tube 11, for urging the bar 22 to swing toward said tube.

As best seen in Figure 4, a bolt 27 extends threadedly through a thickened portion 28 of the bar 22 and has a nut 29 engaging the threaded end thereof disposed on one side of said bar portion 28. A ratchet wheel 30 is journalled on the unthreaded portion of the bolt 27, on the opposite side of the bar 22. Said ratchet wheel 30 has a peripheral portion disposed in the slot 16 on one side of the solder strand portion 13 which extends therethrough, with at least one of the teeth of said ratchet wheel in contact with the solder strand. An elongated lever, designated generally 31, includes spaced substantially parallel walls 32. Corresponding end portions of the walls 32 are provided with aligned openings 33 to loosely engage the unthreaded portion of the bolt 27. Said end portions of the walls 32 straddle the ratchet wheel 30, as seen in Figure 4. The walls 32 are connected by spaced bridge portions 34 and 35, which connect edge portions of said walls which are disposed remote from the tube 11. Said bridge portions 34 and 35 are spaced from the ratchet wheel 30, as seen in Figure 3. A pawl 36 is pivotally carried by the lever 31 for swinging movement between the walls 32 thereof by means of a pivot pin 37 which extends loosely through the intermediate portion of the pawl 36 and is supported by the walls 32. An inner end of the pawl 36 is adapted to engage the teeth 38 of the ratchet wheel 30 and the opposite outer end of said pawl 36 extends outwardly between the bridge members 34 and 35 and has attached thereto a forward end of a pull spring 39. The other rear end of the pull spring 39 is connected to an anchor element 40 which is fixed to and projects from a rear portion of the lever 31. Said spring 39 urges the pawl 36 to swing clockwise as seen in Figure 3 to swing the inner end of said pawl into engagement between two of the ratchet teeth 38, which teeth are uniformly inclined in a counterclockwise direction, as viewed in Figure 3.

As best seen in Figures 4 and 7, a spring 41 has a portion wound about the bolt 27 between the lever 31 and the bolt head and remote from the lever or bar 22.

One end 42 of the spring 41 extends diametrically through and is anchored in the bolt 27 and the other spring end extends from the bolt 27 longitudinally toward the rear end of the lever 31, through an opening in one lever wall 32 and has its end engaging around an edge of said lever wall for anchoring said last mentioned spring end to the lever, as seen at 43 in Figure 7. The tension of the spring 41 urges the lever 31 to swing counterclockwise as seen in Figure 3 in a direction away from the tube 11. The supporting lever or bar 22 has an extension provided with a laterally turned portion forming a stop 44 disposed to be engaged by the free end portion of the lever 31 to limit counterclockwise swinging movement of said lever away from the tube 11.

A pair of arms 45 are secured to the tube portion 15 and straddle the slot 16 thereof. Said arms 45 extend laterally from the tube portion 15 to loosely accommodate therebetween a small wheel 46 which is journalled on a pin or axle 47 which extends loosely through the center thereof and is supported by the arms 45. The wheel 46 is disposed opposite the ratchet wheel 30 and has a peripheral portion thereof extending into the slot 16 and bearing against the opposite side of the portion of the solder strand 13, which is engaged by the teeth 38, to prevent the solder strand bending away from the ratchet wheel.

As best seen in Figures 1 and 2, the lever 31 is provided with a lateral extension 48 at its free end, forming a thumb or finger rest, which projects laterally from one of the walls 32 in a direction away from the bar 22.

The tube 11 has a forward discharge end 11a which is disposed at an oblique angle to the remainder of said tube and which is threaded obliquely into the forward portion of the soldering iron tip 49, so that the tube end 11a discharges obliquely into the longitudinally disposed chamber 50 of the tip 49. The tip 49 has a smaller bore or passage 51, extending from the forward end of the chamber 50, which opens outwardly of the tapered forward end 52 of the soldering iron tip 49.

The rear end portion of the tip 49 is adapted to be seated in a longitudinally disposed forwardly opening socket 53 of a soldering iron head 54 which is recessed, as seen at 55, to accommodate an electric heating element 56 for heating the tip 49. The forward end of a tubular shank 57 joins with the rear end of the head 54 and carries the electrical conductor wires 58 of the heating element 56. A handle 59, only the forward portion of which is shown, is connected to the other rear end of the shank 57. The parts 53 through 59 constitute portions of a conventional soldering iron, and it is to be understood that the feeder attachment 10 may be utilized with other soldering irons, including those where the soldering iron tip 49 is heated by being placed over a flame.

A clamp, designated generally 60, cooperates with the tip 49 and the threaded connection 61 of the tube portion 11a to said tip, for mounting the feeder 10 on the soldering iron. Said clamp 60 comprises complementary clamp strips 62 having complementary portions forming jaws 63 which engage the shank 57 and other complementary portions forming jaws 64 which engage the rear end portion of the tube 11. Said strips 62 are adjustably connected intermediate of their ends by a nut and bolt fastening 65 which is tightened for drawing the jaws 63 into clamping engagement with the shank 57 and the jaws 64 into clamping engagement with the tube 11.

Figure 8 illustrates a slightly modified form of soldering iron tip, designated generally 66, having a longer chamber 67 into which the tube end 11a discharges. Instead of the axial passage 51, the tip 66 has a diagonal passage 68 extending from the forward end of the chamber 67 and which opens through the tapered face of the tapered forward end 69 of the tip 66.

Assuming that the tip 49 is heated by the heating element 56, the solder strand 13 at the will of the user is fed longitudinally through the bore 12 into the chamber 50. This is accomplished by applying a downward pressure to the thumb rest 48 with the thumb of the hand which grasps the handle 59. When the lever 31 is thus swung downwardly, the ratchet wheel 30 will be caused to turn with the lever 31 in a clockwise direction as seen in Figure 3 due to engagement of the inner end of the pawl 36 against the radial shoulder of one of the teeth 38. As the ratchet wheel 30 is thus rotated clockwise, the tips of the teeth 38 thereof by frictional contact with a portion of the strand 13 will move said strand toward the tube end 11a. When pressure is thereafter released on the thumb rest 48, the spring 41 will cause the lever 31 to swing in the opposite direction or counterclockwise. The tips of certain of the ratchet teeth 38 will be held in sufficient frictional contact with the solder strand 13 by the tension of the spring 26 to prevent the ratchet wheel 30 from turning counterclockwise with the lever 31, so that the inner end of the pawl 36 will ride over the inclined back edges of the teeth 38, the spring 39 permitting the pawl to yield and rock counterclockwise, as seen in Figure 3, to accommodate this movement thereof relative to the ratchet wheel 30 and to return the inner end of the pawl to a position behind a shoulder of a tooth 38 after the counterclockwise movement of the lever 31 has been completed relative to the ratchet wheel 30, preparatory to again turning the ratchet wheel 30 clockwise with the lever 31. It will thus be apparent that the solder 13 can be fed at will to the chamber 50 where in a molten state it can flow outwardly through the passage 51. The solder will not be melted until it reaches the chamber 50 so that the solder may not flow back from said chamber into the bore 12. The feeder 10 will function in the same manner with the tip 66 except that the molten solder will be fed outwardly from the chamber 67 through the diagonal passage 68.

It will be readily apparent that by loosening the nut 29 the bolt 27 may be turned slightly counterclockwise, as seen in Figure 1, to increase the tension of the spring 41 on the lever 31 or may be turned clockwise for decreasing the tension of the spring 41.

Various modifications and changes are contemplated and may obviously be resorted to, without departing from the spirit or scope of the invention as hereinafter defined by the appended claims.

I claim as my invention:

1. A solder feeding device comprising an elongated rigid tube including a discharge end and an opposite rear end, said tube having a bore extending from end-to-end thereof adapted to slidably receive a strand of solder, means adapted to support said tube on a soldering iron and with the discharge end of the tube disposed to supply the solder to a soldering iron tip, a bar, means connected to said tube and bar for supporting said bar for swinging movement toward and away from the tube, a second supporting means connecting the bar and tube and limiting swinging movement of the bar toward and away from the tube, a journal member supported by said bar and disposed transversely of the tube, a ratchet wheel turnably mounted on said journal member, said tube having a slot extending diametrically therethrough in which a portion of the ratchet wheel is rotatably received, the teeth of said ratchet wheel engaging a portion of the solder strand extending through said slot, a lever swingably mounted on said journal means, a spring urged pawl pivotally supported by said lever and having an end spring urged into engagement with selected teeth of the ratchet wheel for causing the ratchet wheel to turn in unison with the lever when said lever is swung toward the tube for feeding the solder strand toward the discharge end of said tube and for urging the bar and ratchet wheel to swing toward the tube and solder strand, spring means urging said bar to swing toward the tube for retaining teeth of the ratchet wheel in frictional engagement with the solder strand, a second spring means connected to said lever and urging the lever to swing in the opposite direction, said spring actuated pawl riding over the teeth during movement of the lever in the last mentioned direction for swinging movement of the lever relative to the ratchet wheel.

2. A solder feeding device as in claim 1, a wheel, and journal means supported by said tube and immovable relative thereto for journalling said wheel and by which said wheel is supported with a portion thereof extending loosely into the tube slot in opposed relation to the ratchet wheel and for engagement with the solder strand opposite the ratchet wheel to prevent the solder strand being bent by engagement of the ratchet wheel therewith.

3. A solder strand device as in claim 1, said second spring means being wound on and anchored to said journal member, and said journal member being rotatably adjustable relative to said bar for varying the tension of said second spring means.

4. A solder feeding device comprising an elongated rigid tube having a bore through which a strand of solder is adapted to be fed and including a discharge end from which the solder is adapted to be supplied to a solder iron tip, said tube having a slot extending diametrically therethrough and disposed longitudinally thereof, a ratchet wheel having a peripheral portion disposed for rotation in a portion of said slot, teeth of said ratchet wheel being adapted to contact a portion of the solder strand disposed in the slotted portion of the tube, a journal member on which said ratchet wheel is turnably mounted, means supported by said tube for supporting said journal member in transversely spaced relation to the slotted portion of the tube and transversely of the tube axis, a lever swingably mounted on said journal member, and a spring urged pawl pivotally supported by said lever and constructed and arranged to engage the teeth of said ratchet wheel for turning the ratchet wheel in one direction in unison with said lever and to swing with the lever in the opposite direction relative to the ratchet wheel.

5. A solder feeding device as in claim 4, and a spring having one end anchored to said journal member and an opposite end connected to the lever for turning the lever in the last mentioned direction relative to the ratchet wheel, said journal member being rotatably adjustable in said supporting means for varying the tension of said spring.

6. A solder feeding device as in claim 4, said journal supporting means being supported by the tube for movement toward and away from the tube and means yieldably urging said supporting means toward the tube for yieldably retaining the ratchet wheel teeth in contact with the solder strand for advancing the solder strand toward the discharge end of the tube when the ratchet wheel is turned with the lever and to prevent turning movement of the ratchet wheel in the opposite direction with the lever, said journal supporting means being urged toward the tube by a force applied to the lever to cause said lever to swing in a direction for turning the ratchet wheel with the lever.

7. A solder feeding device as in claim 5, a wheel, journal means supported by said tube and immovable relative thereto for journalling the wheel with a portion of the periphery thereof disposed for rotation in the tube slot in a position opposite to the ratchet wheel and in contact with the solder strand to prevent bending or deflection of the solder strand portion engaged by the ratchet wheel teeth.

References Cited in the file of this patent

UNITED STATES PATENTS

| 1,268,877 | Orme | June 11, 1918 |
| 1,540,859 | Plicque | June 9, 1925 |
| 1,631,063 | Rognley | May 31, 1927 |
| 1,966,200 | Eskilson | July 10, 1934 |

FOREIGN PATENTS

| 379,369 | Germany | Aug. 20, 1923 |
| 379,558 | Germany | Aug. 25, 1923 |